CIRCUIT BREAKER WITH TIMING CONTROL

Original Filed Sept. 18, 1959 3 Sheets-Sheet 1

INVENTOR.
WILLIAM M. POSCHMAN II
BY
Gustav Miller
ATTORNEY

CIRCUIT BREAKER WITH TIMING CONTROL

Original Filed Sept. 18, 1959 3 Sheets-Sheet 2

INVENTOR.
WILLIAM M. POSCHMAN II
BY
Gustav Miller
ATTORNEY

CIRCUIT BREAKER WITH TIMING CONTROL

Original Filed Sept. 18, 1959 3 Sheets-Sheet 3

INVENTOR.
WILLIAM M. POSCHMAN II
BY
Gustav Miller
ATTORNEY

United States Patent Office

Re. 25,656
Reissued Oct. 13, 1964

25,656

CIRCUIT BREAKER WITH TIMING CONTROL

William M. Poschman II, 2133 Industrial Road, North Las Vegas, Nev.

Original No. 3,026,384, dated Mar. 20, 1962, Ser. No. 840,914, Sept. 18, 1959. Application for reissue May 10, 1963, Ser. No. 279,683
11 Claims. (Cl. 200—38)

Matter enclosed in heavy brackets [ ] appears in the original patent but forms no part of this reissue specification; matter printed in italics indicates the additions made by reissue.

This invention relates to an electrical circuit breaker and it particularly relates to a time clock controlled type of circuit breaker.

Although timing controls for circuit breakers have been well known heretofore, all these prior devices have been generally bulky and unduly complex. They not only required an inordinately large amount of space but were difficult to install and expensive to manufacture and maintain. Consequently, they never attained the public appeal and acceptance which they would otherwise have deserved.

It is one object of the present invention to overcome the above and other difficulties of prior devices of this type by providing a timed circuit breaker device which is relatively simple in construction and relatively easy to install and maintain.

Another object of the present invention is to provide a timed circuit breaker device of the aforesaid type which is of relatively small bulk and which is accommodated in an ordinary circuit breaker panel.

Other objects of the present invention are to provide an improved timed circuit breaker device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 1:
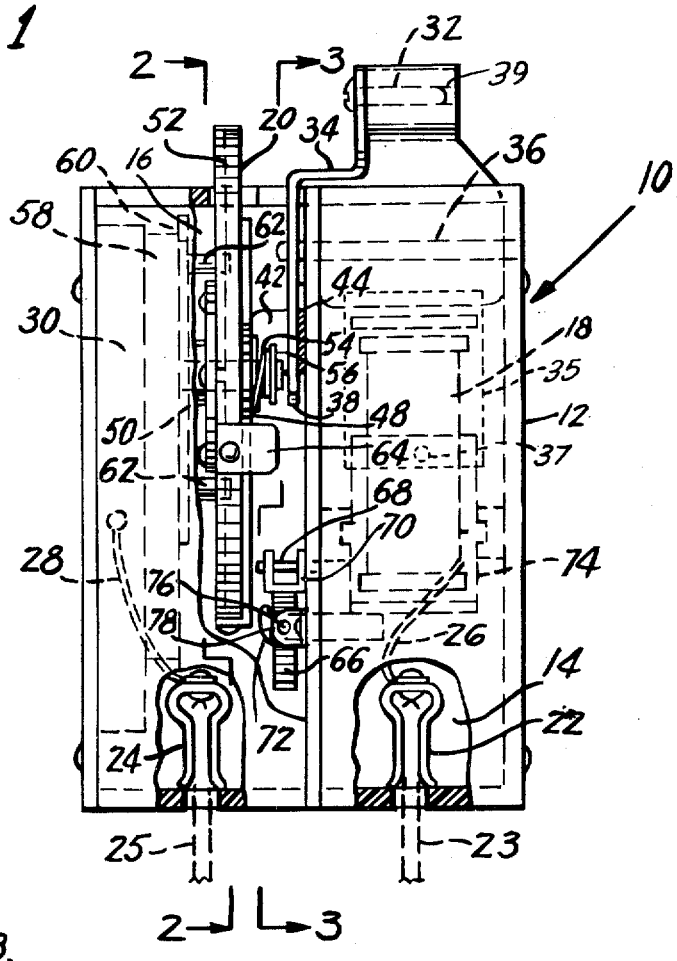
FIG. 1 is a side elevational view, partly broken away, of a device embodying the present invention.

Referring in greater detail to the drawings wherein similar reference characters refer to similar parts, there is shown a timed circuit breaker assembly, generally designated 10, which comprises a housing or cabinet 12 having two compartments 14 and 16. In compartment 14 is provided a circuit breaker 18, of generally the standard type, while in compartment 16 is provided the timing and control mechanism 20. Each of the compartments 14 and 16 has an aperture aligned for use with a standard bus clip, as at 22 and 24 respectively to receive a bus bar 23 and 25 from a source of electrical energy. The clip 22 is electrically connected by wire 26 to the circuit breaker 18 while the clip 24 is connected by wire 28 to the time clock motor 30.

Pivotally connected to the control switch *35* of the circuit breaker 18, as at 32, is a control lever 34. This lever 34 is also pivoted to the housing, as at 36, and is provided at its lower end with a finger 38. This lever 34 depends down into compartment 16 and finger 38 is positioned [between] *to be engaged by* the forwardly extending end flange 40 [and 42] of a longitudinally movable bar 44 movably mounted on the adjacent wall of the compartment 16. This bar *44* is longitudinally movable [between limits fixed by] *within* a [stop] member or collar 46, connected at its upper and lower ends to the compartment wall and positioned to engage *at its respective side edges* with either [of] the flange [40 or] 42 *or finger 38* upon longitudinal movement of bar 44.

Between the flanges 40 and 42 there is provided a cam 48 mounted on the shaft 50 of the time clock motor 30. This cam 48 is retained against the face of a time clock control and time setting wheel 52, mounted loosely but coaxially therewith on the shaft 50, by means of a spring *54* and spring keeper 56. The wheel 52 is operatively connected to a standard five wheel twenty-four hour single motion time clock movement generally indicated at 58 by a clutch mechanism hereinafter described.

The main gear 60 of the time clock movement 58 is provided with two pins 62 extending forwardly from the face thereof and releasably engaging in corresponding openings in the wheel 52. The spring 54 releasably and resiliently holds the pins 62 in engagement with the corresponding openings in the wheel 52 so that these pins 62 act as clutch means to retain the wheel 52 in operative engagement with the clock movement 58. This type of construction permits simple adjustment of the wheel 52 by merely pulling it back against the spring 54 to disengage the pins 62, then rotating the wheel 52 to the desired position and then releasing it to permit the pins 62 to reengage therewith.

Figure 5:
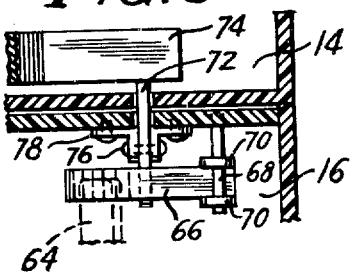
FIG. 5 is a fragmentary sectional view taken on line 5—5 of FIG. 3.

The wheel 52 is provided on its periphery with an adjustable finger 64. This finger 64 is adapted to engage against a lever 66 *having a pair of ears 70* rockably mounted [at] *about a pin* 68 [on a bracket 70] fixed to the wall of the compartment. The lever 66 overlies a [switch-opening] bar 72 underlying the standard overload circuit opening *or trip* bar 74 of the circuit breaker 18. *This trip bar 74 is moved upwardly by the magnetic overload or current sensing device 18 upon circuit overload to press against trip button 37 extending from switch 35 to open the contacts of the switch 35 and permit the control handle 39 thereof which is fixed to lever 34 by pin 32, as shown in FIG. 1, to return to off position.* The bar 72 is pivoted at 76 to bracket members 78 (see FIG. 5) and is biased into the position shown.

The control wheel 52 is calibrated with twenty-four hour markings and with intermediate fifteen minute marks. It is also preferably colored white on the 6:00 to 6:00 daylight hour side and black on the 6:00 to 6:00 night hour side.

Figure 2:
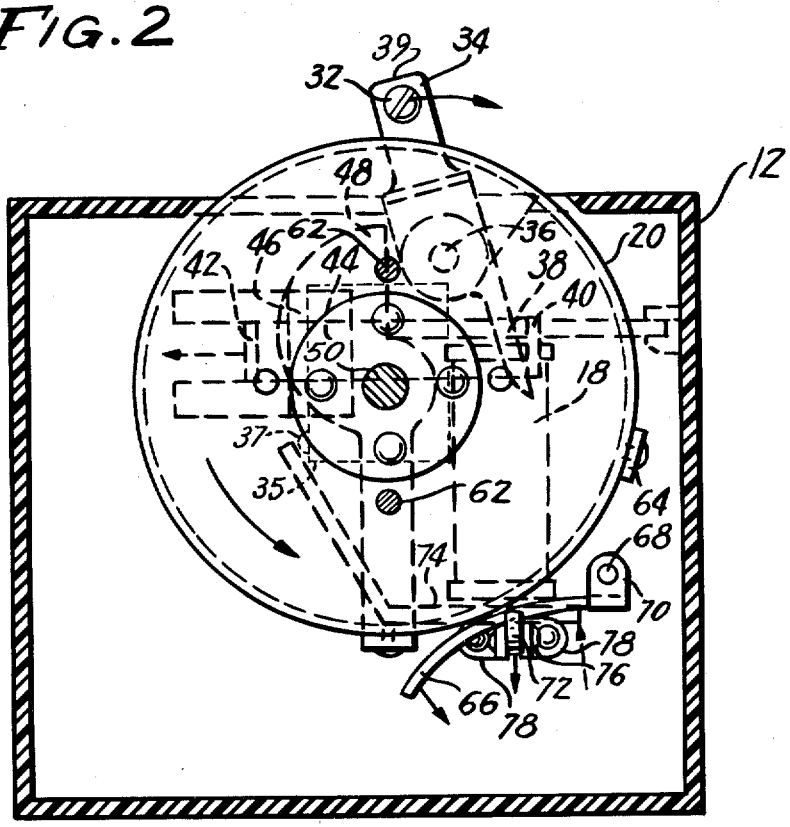
FIG. 2 is a sectional view taken on line 2—2 of FIG. 1, showing the lever in the "off" position.

In operation, as the control wheel 52 rotates, it rotates the cam 48 which, as it moves into the position of FIG. 2, engages flange 42 and pulls back the bar 44. This engages the flange 40 with finger 38 causing the lever 34 to rock [into] *the control handle 39 toward* the "on" position [shown] *as indicated by the arrow* in FIG. 2. In this "on" position, the control switch *35, whose handle 39 is* conencted at 32 to the lever 34, interposes the circuit breaker *sensing coil* 18, [which is otherwise by-passed,] into the circuit leading from bus bar 23. With the flow of electrical energy *to the load* now passing through the circuit breaker *sensing coil* 18, as the wheel 52 continues to rotate through its cycle, it causes the finger 64 to engage lever 66 which, in turn, depresses the outer end of bar 72. This causes bar 72 to rock on its pivot 76 which forces of the opposite end of the bar 72 to push up on the

[overload circuit at a preset time] *circuit* opening *or trip* bar 74 at a pre-set time, *and causing the trip bar 74 to press against trip button 37 and* thereby opening the circuit. This is a momentary action, however, since, as the wheel 52 continues to turn, the finger 64 is disengaged from the lever 66 which then returns to its normal position wherein the [circuit breaker 18 is retained in the circuit] *trip bar 74 returns to its normal position to be* ready to open *the contacts of the circuit breaker under control of the sensing device 18* in the standard manner under overload. In this manner, the protective action of the *circuit* breaker is [maintained] *prepared for operation when the control handle is next moved to "on" position.*

As the wheel 52 continues to rotate, the cam 48 is eventually rotated into the position wherein it *again* engages flange [40] *42* and moves the lever 34 to [open the switch] *move the lever 34 and the switch handle 39* connected [to it at 32] *thereto to "on" position* so as to [remove the circuit breaker 18 from] *again interpose the sensing device in* the circuit.

Figure 7:
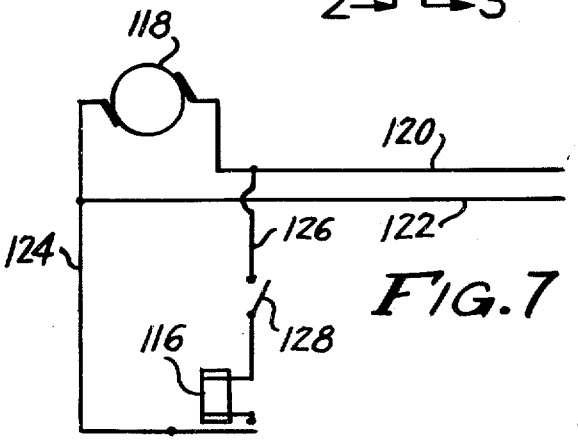
FIG. 7 is a circuit diagram showing the electrical power circuit used in the control mechanism of the embodiment of FIG. 6.
Figure 6:
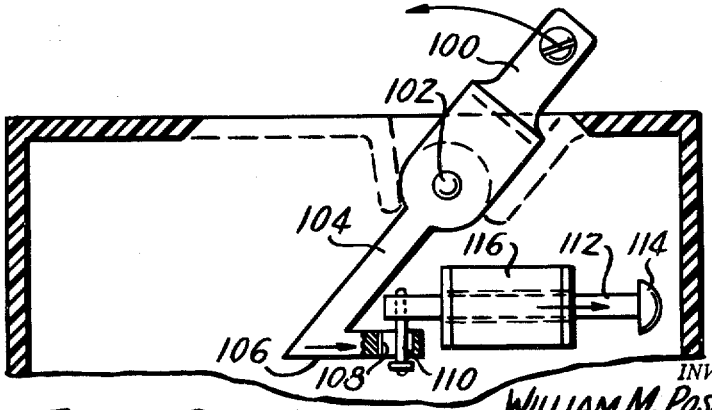
FIG. 6 is a fragmentary view, similar to FIG. 3, but showing an alternative embodiment of the invention.
Figure 3:
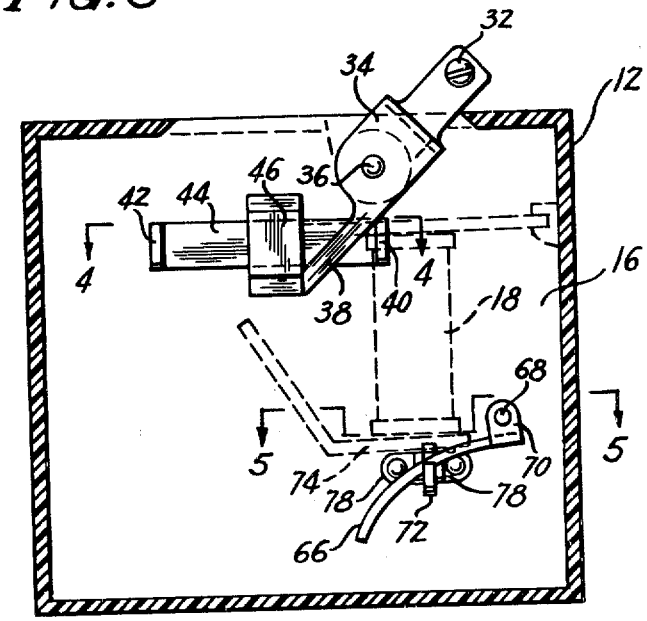
FIG. 3 is a sectional view taken on line 3—3 of FIG. 1, but showing the lever in the "on" positon.
Figure 4:
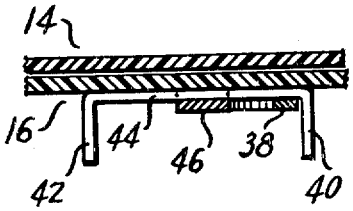
FIG. 4 is a fragmentary sectional view taken on line 4—4 of FIG. 3.

In FIGS. 6 and 7 is shown a modified form of the device wherein the lever 100 is similar to lever 34 and is pivotally mounted at 102. The lower portion of the lever 100, however, consists of an extension 104 having an offset end 106 provided with a slot 108. In this slot 108 is provided a pivot pin 110 to one end of which is connected a rocker arm 112 having a head 114 at its end. This rocker arm 112 is a core extending through a coil 116 forming a solenoid. The coil 116 is connected into the electrical circuit in the manner shown in FIG. 7.

The circuit shown in FIG. 7 comprises the motor 118 connected to the source of electrical energy through lines 120 and 122, and also in circuit with coil 116 through lines 124 and 126. A momentary contact normally open line voltage switch 128 is provided in line 126.

In operation, when the coil 116 is energized, the thrust of the rocker arm 112 to the right (as viewed in FIG. 6) pulls the offset end 106 to the right. This acts to rock the lever 100 around its pivot 102 *to move the handle* into the "on" position. The slot 108 provides sufficient play or slippage to maintain the thermal or magnetic protective features of the circuit breaker. The coil 116 is energized by a cam similar to cam 48. This cam would engage the energizing switch 128 during one part of its rotation and would be disengaged therefrom during the remainder of its rotataion.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. An electrical circuit breaker device comprising a housing having at least two compartments separated by a vertical wall, a circuit breaker in one compartment and a control mechanism in the other compartment, switch means for connecting and disconnecting [said] *a* circuit breaker, from a circuit to be controlled, a control lever operatively connected to said switch means and extending into said other compartment, a control means in said other compartment for moving said control lever to [and out of] switch [opening] *closing* position, cam means operatively associated with said control means for operating said control means, and electrically-actuated timing means operatively connected to said cam means.

2. The device of claim 1 wherein said timing means includes an electric motor having a drive shaft extending therefrom, said cam means being mounted on said drive shaft.

3. The device of claim 2 wherein a wheel is loosely mounted on said drive shaft coaxially with said cam means, a time clock movement operatively connected to said motor and including a gear mounted on said drive shaft coaxially with said wheel, said gear having clutch means comprising a plurality of pins adapted to engage with said wheel, spring means on said drive shaft normally forcing said wheel into engagement with said pins, a circuit opening means in said other compartment operatively associated with said circuit breaker, and means on the periphery of said wheel for actuating said circuit opening means during rotation of said wheel.

4. The device of claim 1 wherein said control means comprises a longitudinally reciprocable bar having flanges at its opposite ends for engagement by said cam means *and said control lever, respectively.*

5. The device of claim 1 wherein said control means comprises a rocker arm connected to an offset end of said control lever, said rocker arm extending through an electrically energized coil to form the core of a solenoid in conjunction with said coil.

6. In an electrical circuit breaker device, an energizing switch operatively connected to a control lever which is, in turn, operatively associated with a cam, said cam being rotated by an electrical timing mechanism including a drive motor, and a circuit opening switch lever operatively connected to said circuit breaker device, said circuit opening switch lever being actuatable by an engagement means positioned at one portion of the periphery of a wheel operatively and selectively connected to said timing mechanism by a releasable clutch mechanism.

7. The device of claim 6 wherein said cam is operatively associated with a reciprocable bar having means at [either] *one* end [to selectively engage] *engageable with* said control lever [and] *to* move it in accordance with the movement of said bar.

8. The device of claim 6 wherein said cam is operatively associated with a normally open switch which is interposed in an electrical circuit between a solenoid coil and said motor, said solenoid coil encompassing a rocker arm operatively connected to said control lever.

*9. In combination, an electrical circuit breaker, a switch means for connecting and disconnecting said circuit breaker from a circuit to be controlled, and a control means connected to said switch means, said control means including a circuit breaker overload opening bar, a timing motor, and means controlled by said timing motor for closing said switch means and for moving said overload opening bar to open said switch means a predetermined time after closure thereof.*

*10. The combination as defined in claim 9 in which said means for closing said switch means and for moving said opening bar comprises a cam movable by said timing motor.*

*11. The combination as defined in claim 10 in which said means for closing said switch means and for moving said opening bar comprises a wheel driven by said cam and a finger adjustably attached to the periphery of said wheel.*

References Cited in the file of this patent or the original patent

UNITED STATES PATENTS

| | | |
|---|---|---|
| 2,578,632 | Miller | Dec. 11, 1951 |
| 2,614,182 | Wells | Oct. 14, 1952 |
| 2,674,664 | Clubb et al. | Apr. 6, 1954 |
| 2,825,770 | Helsper | Mar. 4, 1958 |
| 3,047,684 | Heerdt | July 31, 1962 |